(12) United States Patent
Iwamoto

(10) Patent No.: US 7,905,619 B2
(45) Date of Patent: Mar. 15, 2011

(54) OPTICAL SHEET, AND BACKLIGHT DEVICE AND DISPLAY DEVICE PROVIDED THEREWITH

(75) Inventor: Kenichi Iwamoto, Kobe (JP)

(73) Assignee: Sharp Kabushiki Kaisha, Osaka (JP)

( * ) Notice: Subject to any disclaimer, the term of this patent is extended or adjusted under 35 U.S.C. 154(b) by 581 days.

(21) Appl. No.: 11/917,451

(22) PCT Filed: May 2, 2006

(86) PCT No.: PCT/JP2006/309153
§ 371 (c)(1),
(2), (4) Date: Dec. 13, 2007

(87) PCT Pub. No.: WO2006/134735
PCT Pub. Date: Dec. 21, 2006

(65) Prior Publication Data
US 2009/0296375 A1 Dec. 3, 2009

(30) Foreign Application Priority Data
Jun. 16, 2005 (JP) ................................. 2005-175874

(51) Int. Cl.
*F21V 7/04* (2006.01)
(52) U.S. Cl. ....................... 362/97.4; 362/97.3; 362/97.2; 362/632; 362/633; 362/634
(58) Field of Classification Search ................... 362/632, 362/633, 634, 97.4, 97.2; 349/61–71
See application file for complete search history.

(56) References Cited

U.S. PATENT DOCUMENTS

| | | | |
|---|---|---|---|
| 6,538,709 B1 * | 3/2003 | Kurihara et al. ................ | 349/58 |
| 2002/0114152 A1 | 8/2002 | Fujino et al. | |
| 2006/0126362 A1 * | 6/2006 | Hsieh et al. ................... | 362/633 |
| 2007/0159806 A1 | 7/2007 | Fujino et al. | |
| 2009/0231515 A1 * | 9/2009 | Keam et al. ..................... | 349/71 |
| 2010/0271568 A1 * | 10/2010 | Jung et al. ....................... | 349/65 |

FOREIGN PATENT DOCUMENTS

| | | |
|---|---|---|
| JP | 08-234678 A | 9/1996 |
| JP | 09-197580 A | 7/1997 |
| JP | 10-255533 A | 9/1998 |
| JP | 2000-206526 A | 7/2000 |

OTHER PUBLICATIONS

Official communication issued in the International Application No. PCT/JP2006/309153, mailed on Jul. 18, 2006.

* cited by examiner

*Primary Examiner* — Anabel M Ton
(74) *Attorney, Agent, or Firm* — Keating & Bennett, LLP

(57) ABSTRACT

A notch is formed in a side of an optical sheet. As seen in plan view, the notch is shaped such that the maximum width of the notch as measured in the direction parallel to the line connecting both ends of a mouth portion of the notch is greater than the width of the mouth portion along the side of the optical sheet. Here, it is preferable that the notch be polygonal or have a curved shape as seen in plan view.

8 Claims, 11 Drawing Sheets

FIG.2
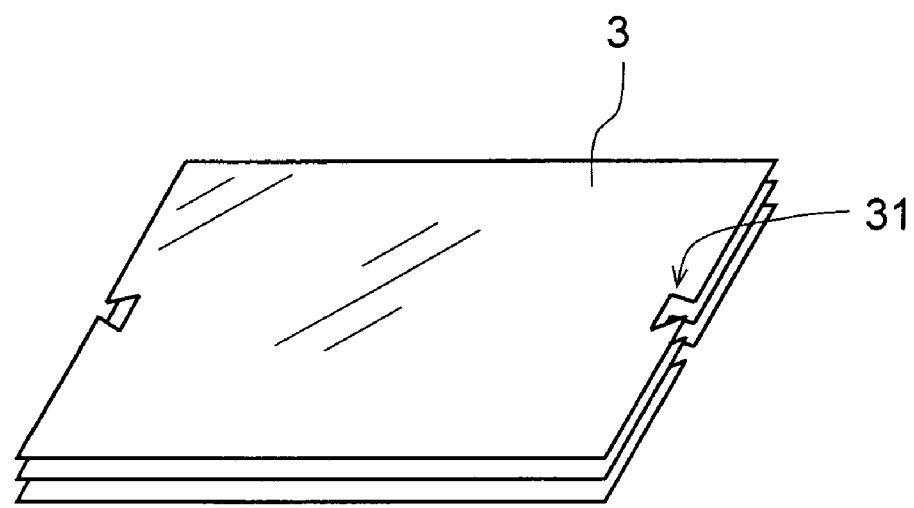
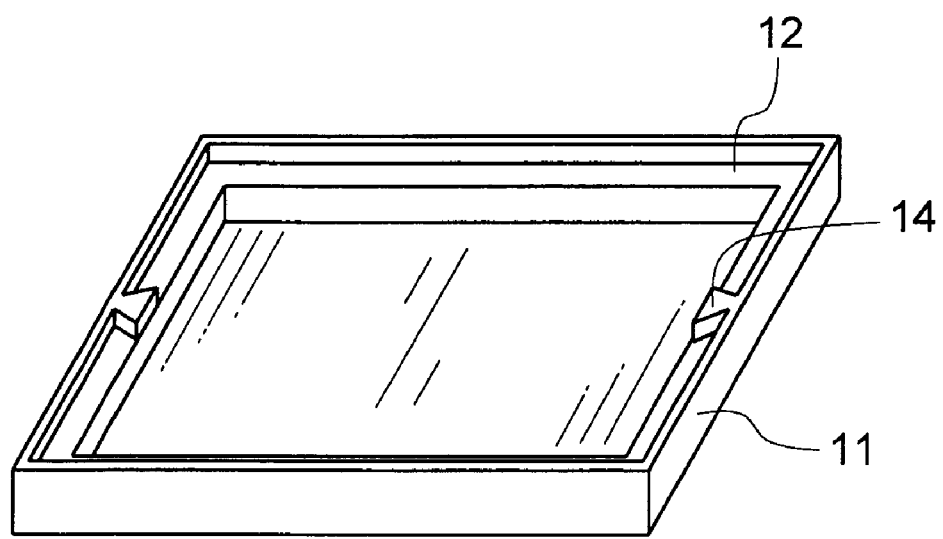

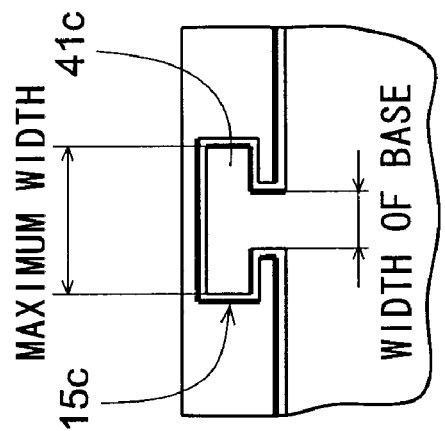
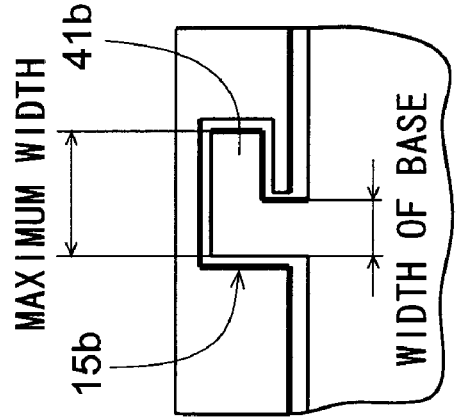
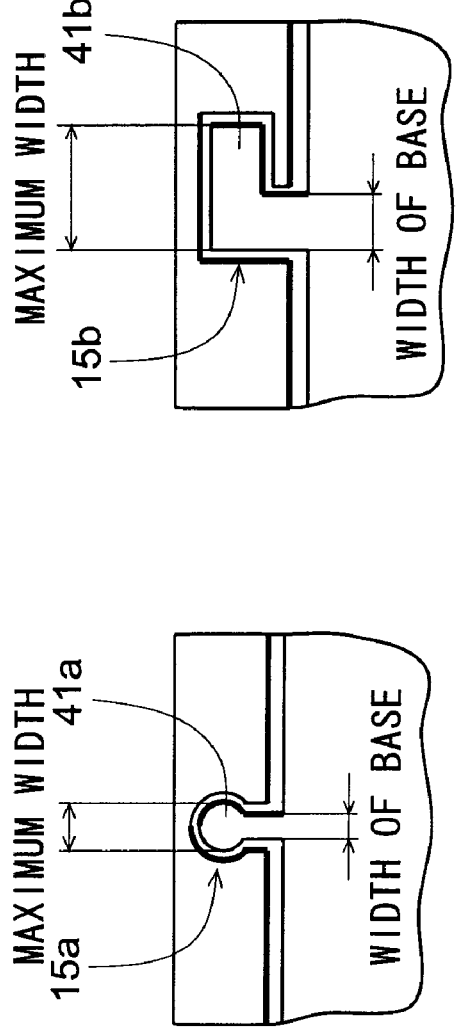
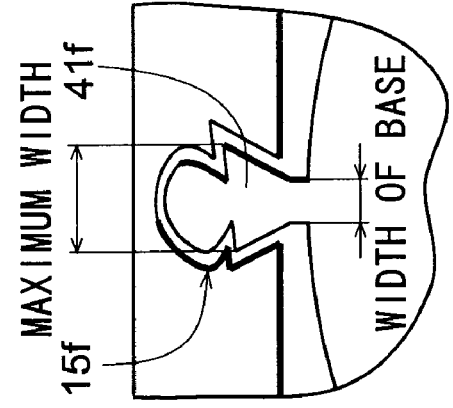
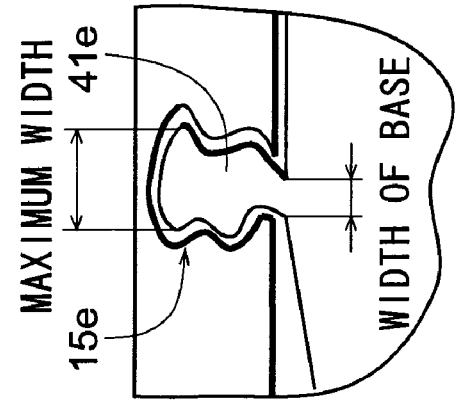
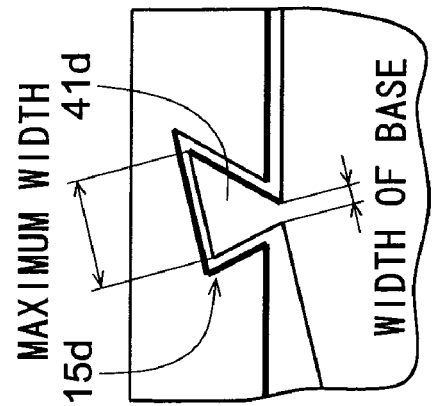

OPTICAL SHEET, AND BACKLIGHT DEVICE AND DISPLAY DEVICE PROVIDED THEREWITH

BACKGROUND OF THE INVENTION

1. Field of the Invention

The present invention relates to an optical sheet and more particularly to an optical sheet for use in a backlight device or the like in a display device.

2. Description of the Related Art

Conventionally, CRTs (cathode ray tubes) have been commonly used in display devices such as television sets. In recent years, however, flat-panel displays, with the advantages of being space-saving and power-saving, and with increasingly improved viewing angle, contrast, color reproduction and other characteristics, have been coming into wider use. In particular, liquid crystal display devices are replacing CRTs.

In liquid crystal display devices, since liquid crystal itself does not emit light, backlight or external light is shone on the display area formed by the liquid crystal, and the alignment of the liquid crystal is controlled by a drive circuit to control the amount of light passing through the liquid crystal. In this way, liquid crystal display devices display images. Here, the light from the light source such as a backlight needs to be shone evenly on the liquid crystal forming the display area, and to achieve that, optical sheets such as a diffusion sheet and a prism sheet are interposed between the backlight and the liquid crystal. Most such optical sheets are formed of resin, and thus they expand and contract as the ambient temperature varies. Hence, fixing optical sheets in a display device requires a design that accommodates the expansion and contraction of the optical sheets.

Conventionally, optical sheets are fitted into a frame, for example, as shown in FIG. 9. Specifically, at the center of opposite sides of optical sheets 3', there are formed notches 31' that are substantially rectangular and arc-shaped at the dead end; correspondingly, at the center of opposite sides of a step 12 in a case (frame) 11 into which the optical sheets 3' are going to be fitted, there are formed projections 14' that are similar in shape to but slightly smaller than the notches 31'. The notches 31' in the optical sheets 3' fit around the projections 14' on the case 11, and this permits the optical sheets 3' to be positioned in place.

Alternatively, as shown in FIG. 10, rectangular slots 41' are formed in opposite side edges of optical sheets 4', and correspondingly projections 15' are formed at the center of the opposite sides of a step 12 in the case 11 into which optical sheets 4' are going to be fitted. The slots 41' in the optical sheets 4' fit around the projections 15' on the case 11, and this permits the optical sheets 4' to be positioned in place.

Inconveniently, however, with the former method of positioning the optical sheets 3' which involves the engagement of the substantially rectangular notches 31' with the projections 14', as shown in FIG. 11, the notches 31' in the optical sheets 3' may disengage from the projections 14' due to the thermal contraction of the optical sheets 3' during use. If the optical sheets 3' disengage from the projections 14', the disengaged side of the optical sheets 3' sinks under gravity, causing the optical sheets 3' to warp or deform. This causes defects such as uneven display in a display device. With the latter method of positioning the optical sheets 4', when the slots 41' are formed in them, or when they receive an external impact, as shown in FIG. 12, a tear may develop from a slot 41' to a side of the optical sheets 4'.

SUMMARY OF THE INVENTION

In order to overcome the problems described above, preferred embodiments of the present invention are constructed to position optical sheets in place reliably and quickly, to prevent the optical sheets from disengaging from a case due to their thermal contraction during use, and to prevent the optical sheets from developing a tear due to their being shaped or otherwise processed or their receiving an external impact.

Preferred embodiments of the invention also provide a backlight device and a display device that are free from a crease, warp or tear in optical sheets and are thus, are free from uneven brightness or display.

According to a preferred embodiment of the present invention, an optical sheet has a notch formed in a side thereof. Here, as seen in plan view, the maximum width of the notch as measured in a direction parallel to a line connecting both ends of a mouth portion of the notch is greater than the width of the mouth portion. The optical sheets mentioned in this specification are optical sheets that serve to refract, diffract, reflect or otherwise act on light; specifically, here, it thereby diffuses, condenses and otherwise acts on light emitted from the light source to direct the light to the back of a display panel. Specifically, the optical sheets preferably include a diffusing sheet, a prism sheet, a polarization-selective reflecting/transmitting sheet and a reflecting sheet.

Here, it is preferable that the notch be polygonal or have an at least partly curved shape as seen in plan view.

According to another preferred embodiment of the present invention, a backlight device for a display device includes: a light source emitting light; an optical sheet adjusting an optical path of the light emitted from the light source to direct the light to the back side of a display panel; and a frame for attaching the optical sheet to the back side of the display panel. Here, any one of the optical sheets mentioned previously is preferably used as the optical sheet, an at least one projection with which the at least one notch in the optical sheet respectively engages is formed on the frame so that, by making the at least one notch in the optical sheet engage with the at least one projection on the frame, the optical sheet is positioned in place.

In order to restrict the displacement of the optical sheet in all directions, it is preferable that, in a two-dimensional rectangular coordinate system having an origin G (0, 0) thereof at a center of gravity of the optical sheet, having a y-axis thereof running perpendicularly to a side of the rectangular optical sheet that is located highest in a direction of gravity in actual use, and having an x-axis thereof running parallel to the side of the optical sheet, the sum of an x-coordinate of a location at which the at least one projection on the frame respectively engages with the at least one notch in the optical sheet equal zero.

According to another preferred embodiment of the present invention, an optical sheet has a protrusion formed on the side thereof. Here, as seen in plan view, the maximum width of the protrusion as measured in a direction parallel to a line connecting both ends of a base of the protrusion along a side of the protrusion is greater than the width of the base.

Here, it is preferable that the protrusion be polygonal or have an at least partly curved shape as seen in plan view.

According to another preferred embodiment of the present invention, a backlight device for a display device includes: a light source emitting light; an optical sheet adjusting an optical path of the light emitted from the light source to direct the light to the back side of a display panel; and a frame for attaching the optical sheet to the back side of the display panel. Here, any one of the above-mentioned optical sheets on which the protrusions are formed is preferably used as the optical sheet and at least one recess with which the at least one protrusion on the optical sheet respectively engages is formed in the frame so that, by making the at least one protrusion on the optical sheet engage with the at least one recess in the frame, the optical sheet is positioned in place.

In order to restrict the displacement of the optical sheet in all directions, it is preferable that, in a two-dimensional rectangular coordinate system having an origin G (0, 0) thereof at a center of gravity of the optical sheet, having a y-axis thereof running perpendicularly to a side of the rectangular optical sheet that is located highest in a direction of gravity in actual use, and having an x-axis thereof running parallel to the side of the optical sheet, the sum of an x-coordinate of a location at which the at least one recess in the frame respectively engages with the at least one protrusion on the optical sheet equal zero.

According to yet another preferred embodiment of the invention, a display device includes any one of the backlight devices mentioned previously.

In an optical sheet according to a preferred embodiment of the present invention, the notch formed in the side of the optical sheet or the protrusion formed on the side thereof is engaged with the projection formed on the frame or the recess formed therein. Thus, it is possible to position the optical sheet in place reliably and quickly. Moreover, in the notch, as seen in plan view, the maximum width of the notch as measured in the direction parallel to the line connecting both ends of the mouth portion of the notch is greater than the width of the mouth portion; in the protrusion, as seen in plan view, the maximum width of the protrusion as measured in a direction parallel to the line connecting both ends of the base of the protrusion along the side thereof is greater than the width of the base. By doing so, even if the optical sheet contracts thermally, the optical sheet is prevented from disengaging from the frame.

With the notch in the optical sheet or the protrusion thereon formed to have a polygonal shape or a curved shape as seen in plan view, it is possible to facilitate the engagement of the notch or the protrusion with the projection on the frame or the recess therein, and also to further prevent the optical sheet from disengaging from the frame.

In a backlight device or a lighting device according to a preferred embodiment of the present invention, any one of the optical sheets mentioned previously is used, the projection or the recess with which the notch in the optical sheet or the protrusion thereon engages is formed on or in the frame and the notch in the optical sheet or the protrusion thereon is engaged with the projection on the frame or the recess therein. In this way, the optical sheet is positioned in place. Thus, even if the optical sheet contracts thermally during use, the optical sheet is prevented from disengaging from the frame. Hence, it is possible to obtain a high-quality display that is free from uneven brightness, uneven display and the like.

In a two-dimensional rectangular coordinate system, having an origin G (0, 0) thereof at the center of gravity of the optical sheet, having a y-axis thereof running perpendicularly to the side of the rectangular optical sheet that is located highest in the direction of gravity in actual use, and having an x-axis thereof running parallel to the side of the optical sheet, the sum of an x-coordinate of a location at which the protrusion on the frame or the recess therein engages with the notch in the optical sheet or the protrusion thereon is set to zero. This helps restrict the displacement of the optical sheet in all directions.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 2 is a perspective view showing an example of optical sheets and a backlight device according to a preferred embodiment of the present invention.

FIGS. 8A-8F are plan views showing other shapes of notches in the optical sheets and projections of the cases.

DETAILED DESCRIPTION OF PREFERRED EMBODIMENTS

Hereinafter, with reference to the accompanying drawings, a description will be given of optical sheets, a backlight device and a display device according to the present invention. The preferred embodiments described below are, however, not meant to limit the present invention in any way.

Figure 1:
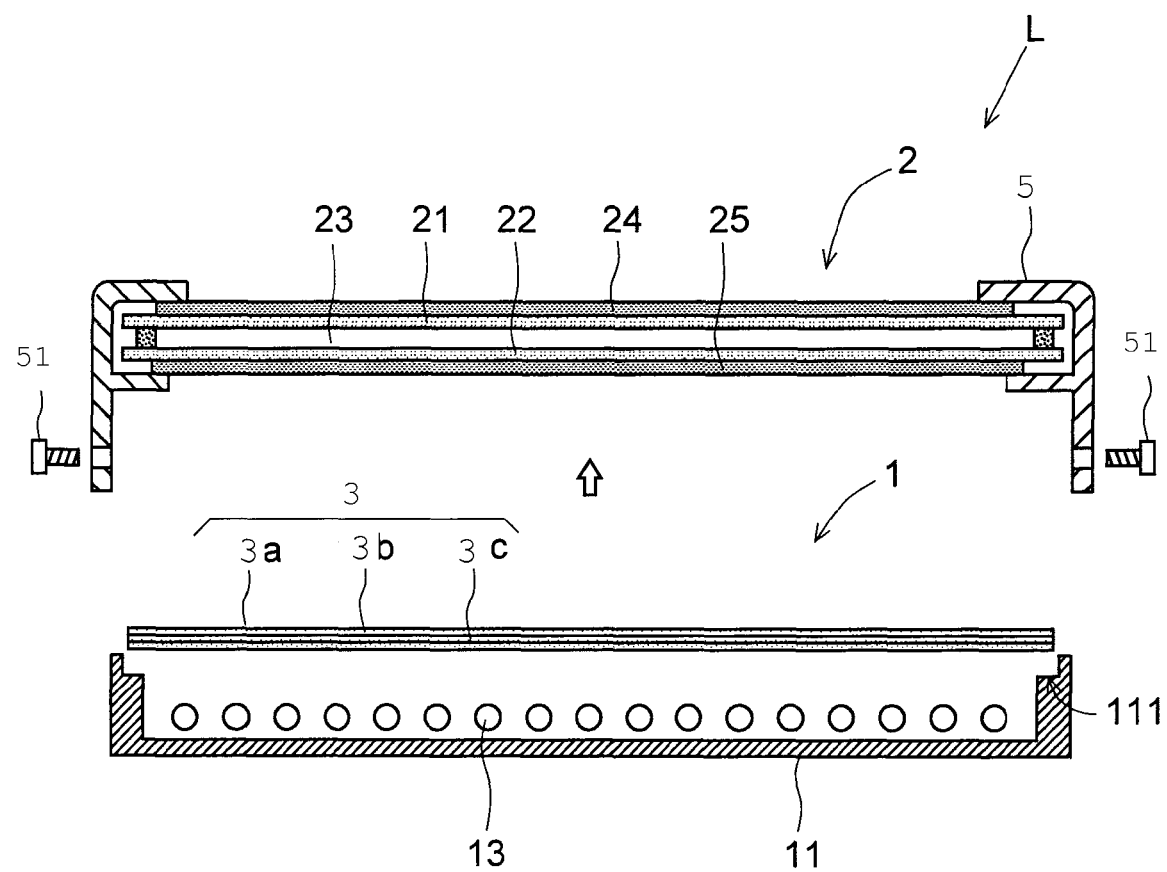
FIG. 1 is a schematic diagram showing an example of the structure of a liquid crystal device according to a preferred embodiment of the present invention.

In FIG. 1, a liquid crystal display device (display device) L preferably includes: a liquid crystal panel (display panel) 2 attached to a chassis 5; and a backlight device 1 arranged on the back side of the liquid crystal panel 2 by being fixed to the chassis with screws 51.

The liquid crystal panel 2 includes: transparent substrates 21 and 22 arranged opposite each other; liquid crystal 23 sealed in between the transparent substrates 21 and 22; and polarizing plates 24 and 25 attached to the outside surfaces of the transparent substrates 21 and 22 to align the directions of the polarization planes of incoming and outgoing light, respectively. As seen in a plan view, the liquid crystal panel 2 has a large number of pixels arranged in a matrix. A circuit board (unillustrated) for controlling the alignment of the liquid crystal 23 is connected to a driver (unillustrated) for driving the liquid crystal panel 2.

The backlight device 1 preferably includes: a case (frame) 11 in the shape of a rectangular parallelepiped with its top open; a plurality of linear light sources (cold cathode lamps) 13 arranged side by side on the inside bottom of the case 11; and a plurality of optical sheets 3a, 3b and 3c (which are also referred to collectively as "the optical sheet 3") that are fitted on a step 12 formed inside the open top of the case 11 and that thus seal the open top.

In this preferred embodiment, the optical sheet 3 preferably includes three optical sheets 3a, 3b and 3c laid on top of each other and fixed together. The optical sheet refracts, diffracts, reflects or otherwise acts on light; specifically, here, it thereby diffuses, condenses and otherwise acts on the light from the linear light sources 13 so as to direct it to the back side of the liquid crystal panel 2. Examples of such an optical sheet include: a prism sheet having, on the light-exit-side surface thereof, a plurality of prisms with an isosceles triangular cross section formed periodically; a polarization-selective reflecting/transmitting sheet (e.g., "DBEF" manufactured by 3M company) that selectively reflects light so that the light is not absorbed by the polarizing plate 25 in the liquid crystal panel 2; and a diffusing sheet (e.g., "PC-03" manufactured by Keiwa Shoko Co., Ltd.) that diffuses light.

Examples of combinations of different optical sheets include, with the components of each combination named in order from the linear light sources 13 to the liquid crystal panel 2: a combination of a diffusing plate, a diffusing sheet, a prism sheet and a polarization-selective reflecting/transmitting sheet; a combination of a diffusing plate, a diffusing sheet, a prism sheet and a diffusing sheet; and a combination of a diffusing plate, a diffusing sheet, a diffusing sheet, a diffusing sheet, a diffusing plate, a diffusing sheet and a diffusing sheet. These optical sheets are each about 0.1 mm to 2.0 mm thick, and their size in area is adjusted according to the size of the display screen. Needless to say, it is simply for the sake of convenience that FIG. 1 shows an example with three optical sheets; according to the present invention, the number of optical sheets is subject to no particular restriction. The types of optical sheets used, the order in which they are laid together, etc. are appropriately determined to suit particular applications.

Next, how the optical sheet is fitted into the case will be described. In FIG. 2 is shown an example of how the optical sheet is fitted. The optical sheet 3 used here preferably is rectangular or substantially rectangular; substantially at the center of each short side thereof, there is formed a notch 31 whose width becomes continuously greater as it extends from the short side toward the center of the optical sheet 3. On a step 12 in the case 11, there are formed projections 14 that are similar in shape to but slightly smaller than the notches 31 in the optical sheet 3. The notches 31 in the optical sheet 3 fit around the projections 14 on the case 11, and this permits the optical sheet 3 to be positioned on the step 12 of the case 11, with the perimeter of the optical sheet 3 resting thereon.

Figure 3:
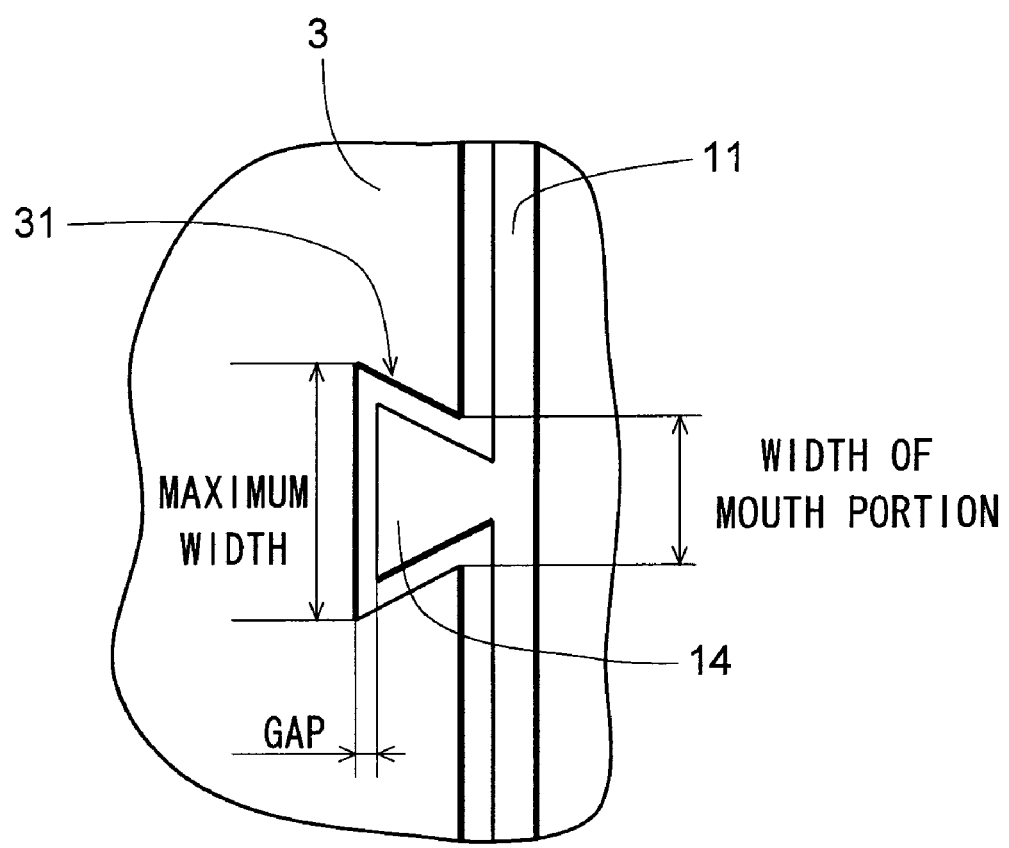
FIG. 3 is an enlarged plan view of a portion of the optical sheets in FIG. 2 where they engage with a case.

In FIG. 3 is shown an enlarged plan view of a portion of the optical sheet 3 where it engages with the case 11. In the notch 31 in the optical sheet 3, the maximum width of the notch 31 as measured in the direction parallel to the side of the optical sheet 3 in which the notch 31 is formed is greater than the width of the mouth portion of the notch 31 along the side of the optical sheet 3. The projection 14 on the case 11 is similar in shape to the notch 31 in the optical sheet 3, and is shaped such that, when the notch 31 in the optical sheet 3 fits around the projection 14, a slight gap is left therebetween. This gap is designed to absorb the thermal expansion and contraction of the optical sheet 3; it is generally preferable that the gap be about 1 mm to about 3 mm wide, for example. The maximum width of the projection 14 is preferably greater than the width of the mouth portion of the notch 31.

Figure 11:
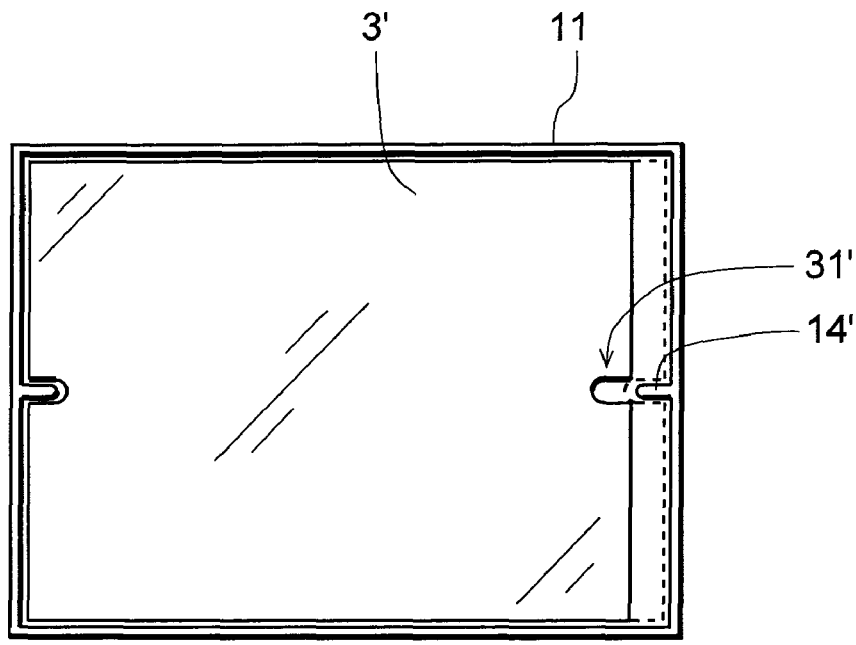
FIG. 11 is a diagram showing a defect in the optical sheets in FIG. 9 resulting from their thermal contraction.
Figure 12:
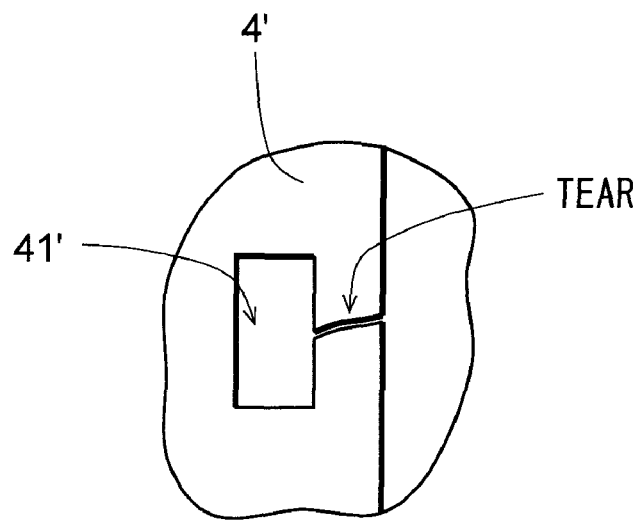
FIG. 12 is a diagram showing a defect in the optical sheet in FIG. 10.

With this structure, for example, even when the optical sheet 3 thermally contracts inward of the case 11 as shown in FIG. 11, the end of the projection 14 on the case 11 does not disengage from the mouth portion of the notch 3. This helps surely prevent the optical sheet 3 from disengaging from the case 11.

Figure 4A:
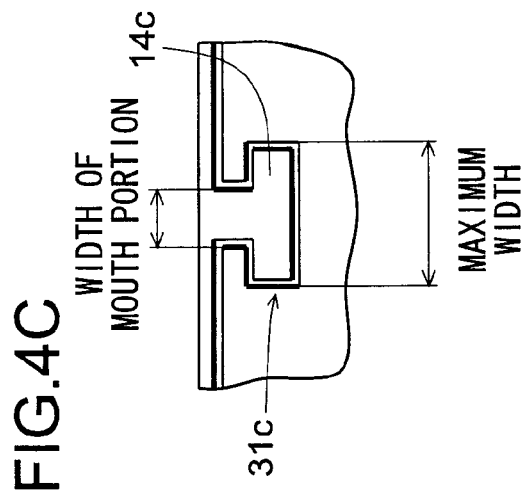
FIGS. 4A-4F are plan views showing other shapes of notches in the optical sheets and projections on the cases.
Figure 4B:
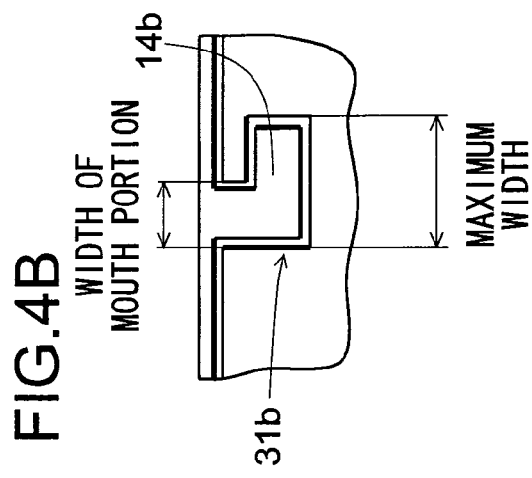
Figure 4C:
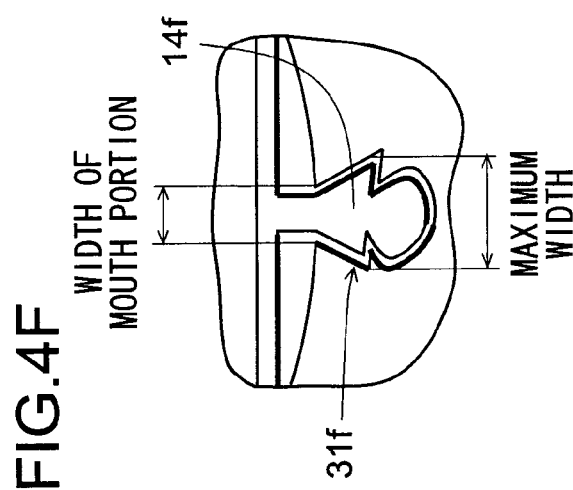
Figure 4D:
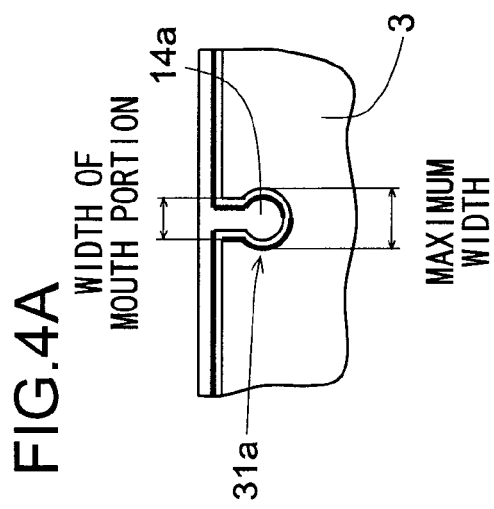
Figure 4E:
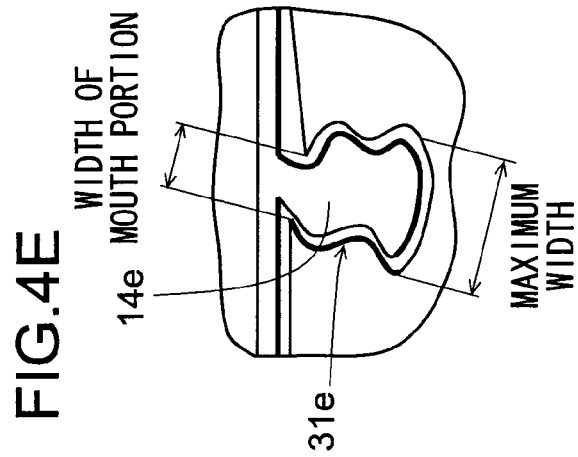
Figure 4F:
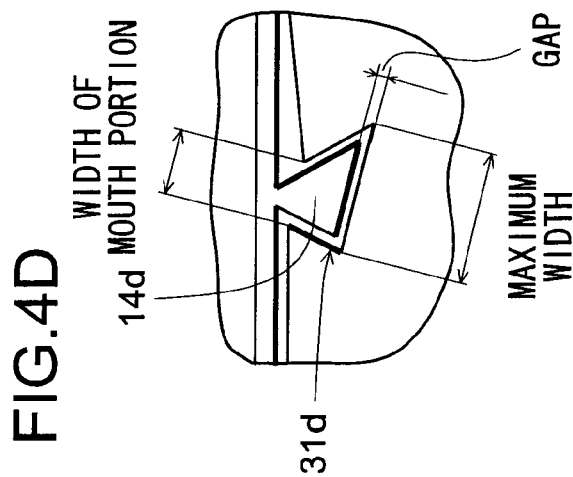

The shape of the notch 31 formed in the optical sheet 3 is subject to no particular restriction except that the maximum width of the notch 31 needs to be greater than the width of the mouth portion. FIGS. 4A-4F show some examples. As shown in FIG. 4A, the notch 31*a* may be circular, with the projection 14*a* on the case 11 correspondingly formed circular as seen in plan view. As shown in FIG. 4B, the notch 31*b* may be L-shaped; or as shown in FIG. 4C, the notch 31*c* may be inverted T-shaped. Or, as shown in FIGS. 4D, 4E, and 4F, the notch 31*d*, 31*e*, or 31*f* may be so shaped that the line connecting both ends of the mouth portion of the notch 31*d*, 31*e*, or 31*f* is not parallel to the side of the optical sheet 3 in which the notch 31*d*, 31*e*, or 31*f* is formed. With any of these shapes, so long as the maximum width of the notch 31 is greater than the width of the mouth portion, the benefits of the present invention are obtained.

Figure 5A:
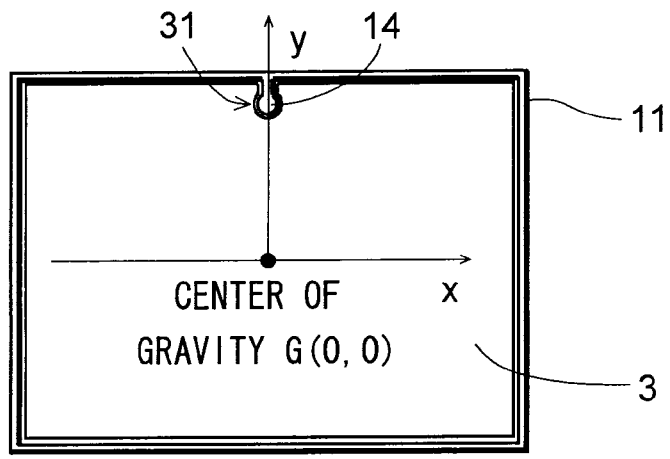
FIGS. 5A-5C are plan views showing preferred examples of locations where the notches engage with the projections.

The locations where the notches 31 in the optical sheet 3 are formed and the number of notches 31 formed are subject to no particular restriction; however, in consideration of the strength and the ease of assembly of the optical sheet 3 and other factors, it is preferable that as few notches as possible be formed. In a case where only one notch 31 is formed, it is preferable to form, as shown in FIG. 5A, the projection 14 on the frame 11 and the notch 31 in the optical sheet 3 on a line that passes through the center G (0, 0) of gravity of the optical sheet and that perpendicularly intersects the top side of the optical sheet 3, that is, its side located highest in the direction of gravity in actual use. Thus, it is possible to restrict the displacement of the optical sheet 3 in all directions.

Figure 5B:
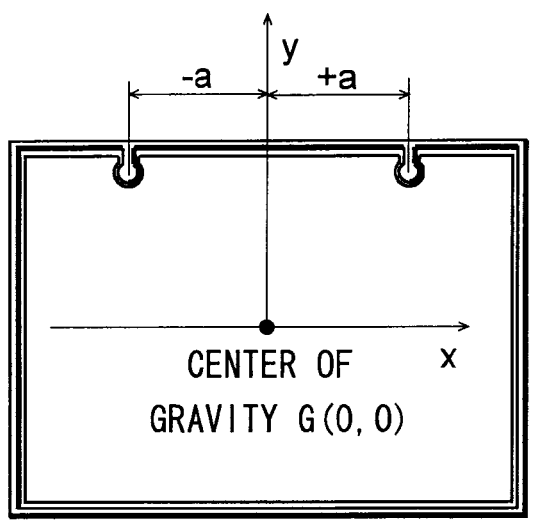
Figure 5C:
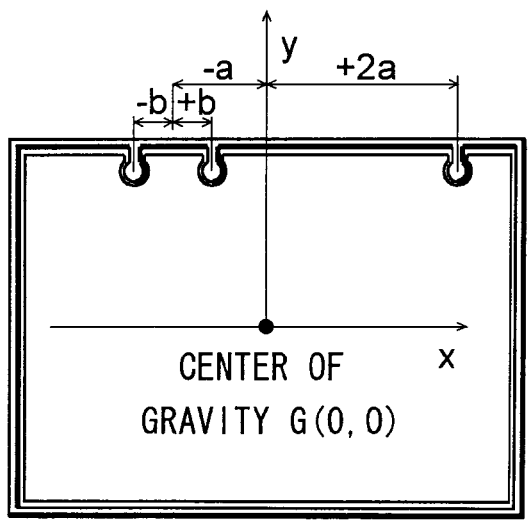

In a case where, in the top side of the optical sheet 3, more than one engagement portions where a projection 14 engages with a notch 31 are provided, as considered in a two-dimensional rectangular coordinate system having its origin G (0, 0) at the center of gravity of the optical sheet 3, having its y-axis running parallel to a line that perpendicularly intersects the top side of the optical sheet 3 and having its x-axis running parallel to the top side of the optical sheet 3, it is preferable that the sum of the x-coordinates of locations where the projections 14 on the frame 11 engage with the notches 31 in the optical sheet 3 be zero. In FIG. 5B, for example, engagement portions are provided at locations (+a) and (−a) in the top side of the optical sheet in the direction of the x-axis. In FIG. 5C, engagement portions are provided at locations (+2a), (−a+b) and (−a−b) in the top side of the optical sheet in the direction of the x-axis. The sum of the x-coordinates of these locations is zero, with the result that the optical sheet 3 is balanced about the y-axis passing through the center G of gravity of the optical sheet 3.

Figure 6:
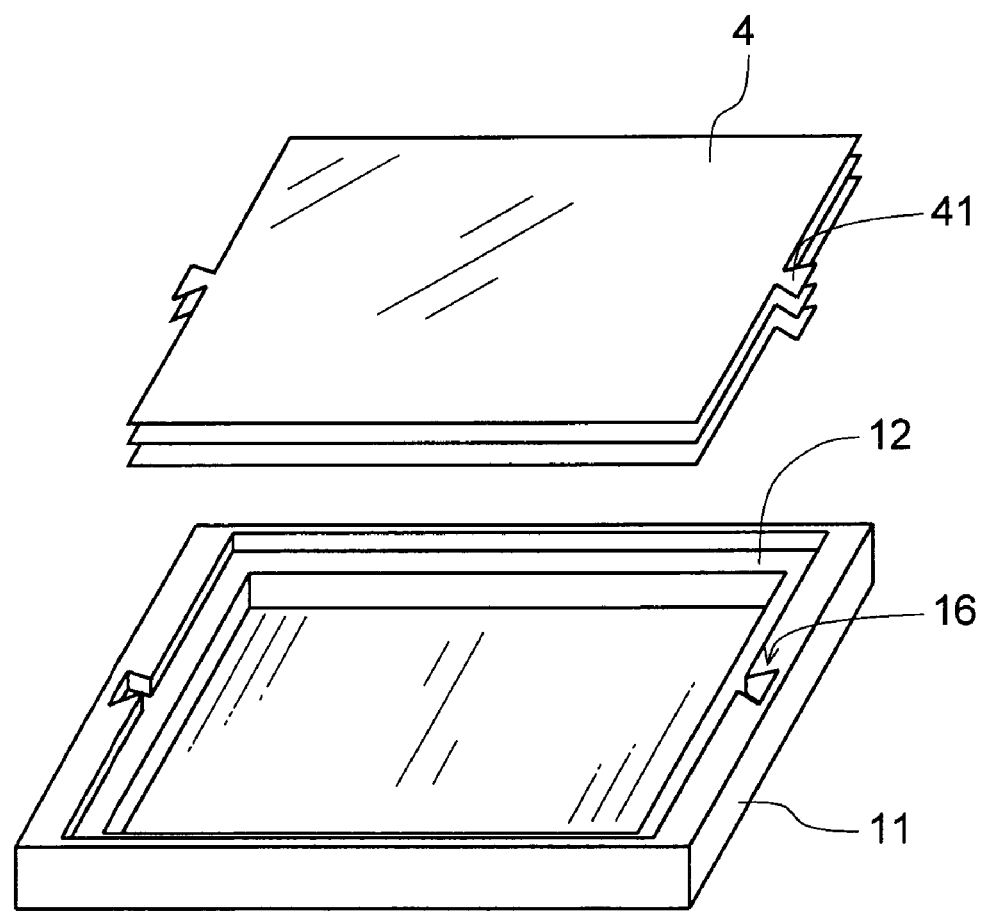
FIG. 6 is a perspective view showing an example of optical sheets and a backlight device according to another preferred embodiment of the present invention.

Next, a description will be given of an optical sheet and a backlight device according to another preferred embodiment of the present invention. FIG. 6 is a perspective view showing an example of the optical sheet and the backlight device of a preferred embodiment of the present invention. The optical sheet 4 used here preferably is rectangular or substantially rectangular; there are formed protrusions 41 whose widths become continually greater as the protrusions 41 extend from the approximate centers of both short sides of the optical sheet 4 toward the outside. In the top of the case 11, there are formed recesses 15 that loosely fit around the protrusions 41 on the optical sheet 4. The depth of the recess 15 is appropriately determined according to the thickness and the number of optical sheets 4 used. The protrusions 41 on the optical sheet 4 fit into the recesses 15, and this permits the optical sheet 4 to be positioned on the step 12 in the case 11.

Figure 7:
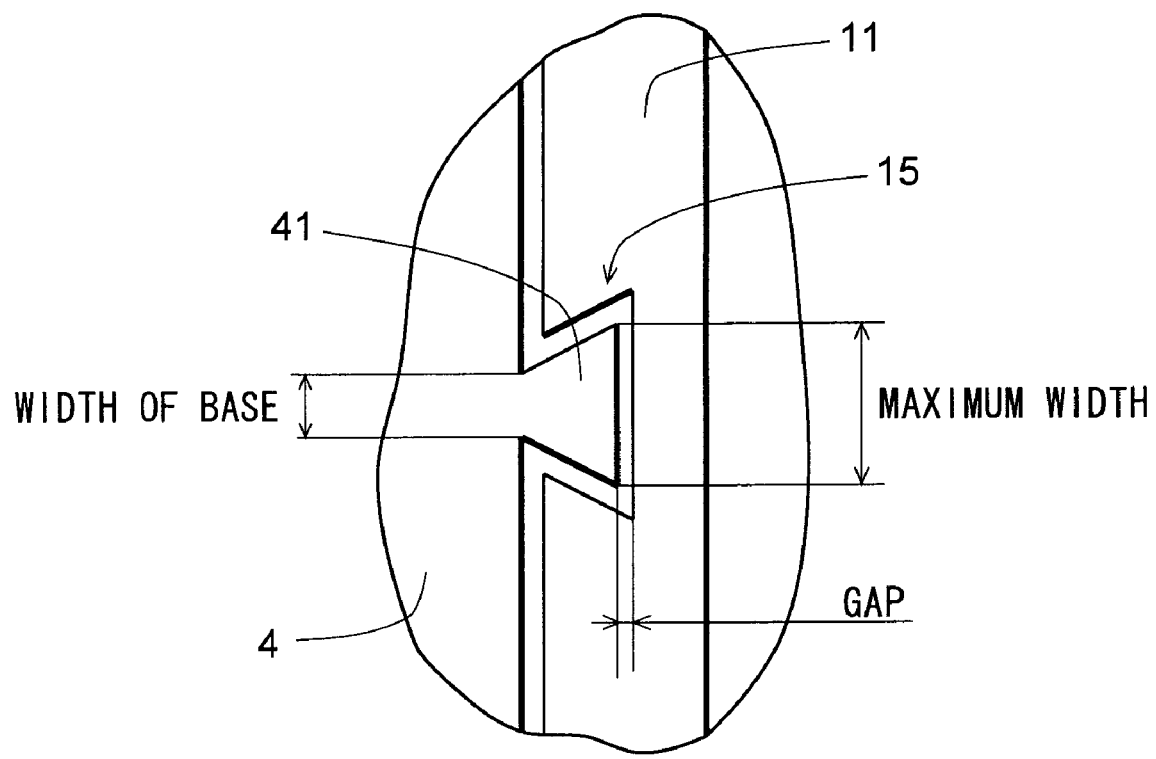
FIG. 7 is an enlarged plan view of a portion of the optical sheets in FIG. 6 where they engage with the case.
Figure 9:
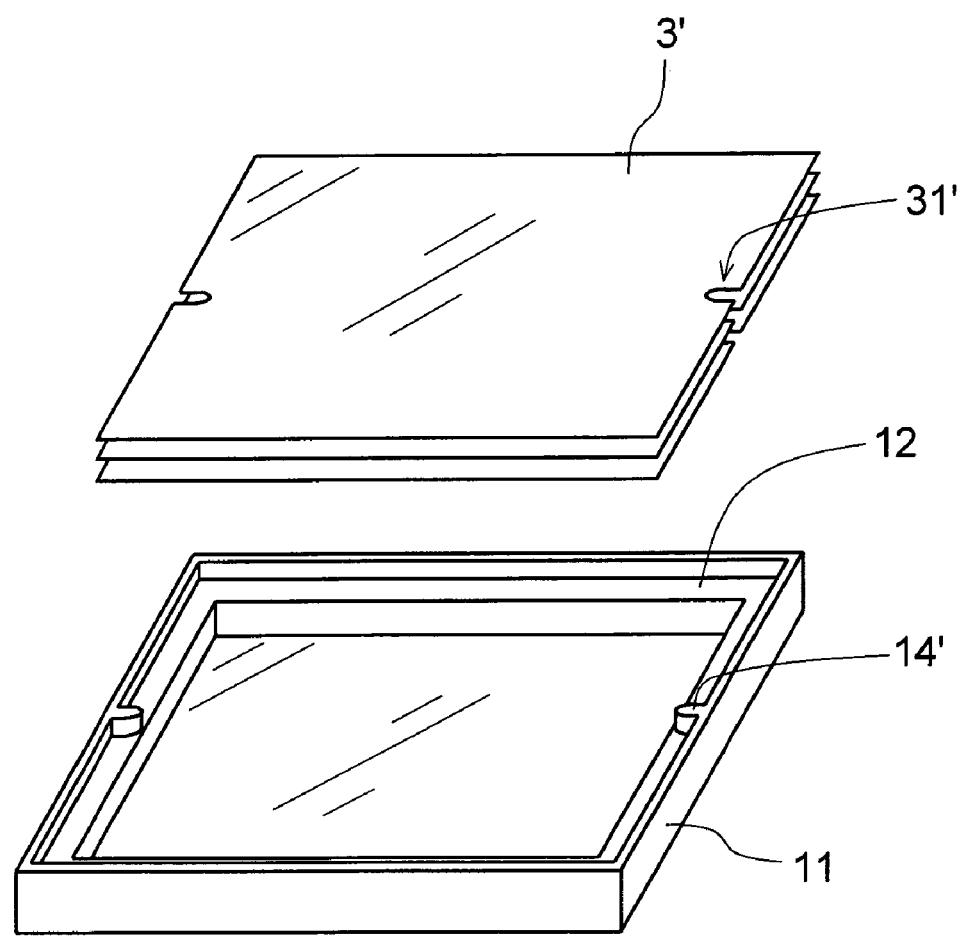
FIG. 9 is a perspective view showing an example of conventional optical sheets and a conventional backlight device.
Figure 10:
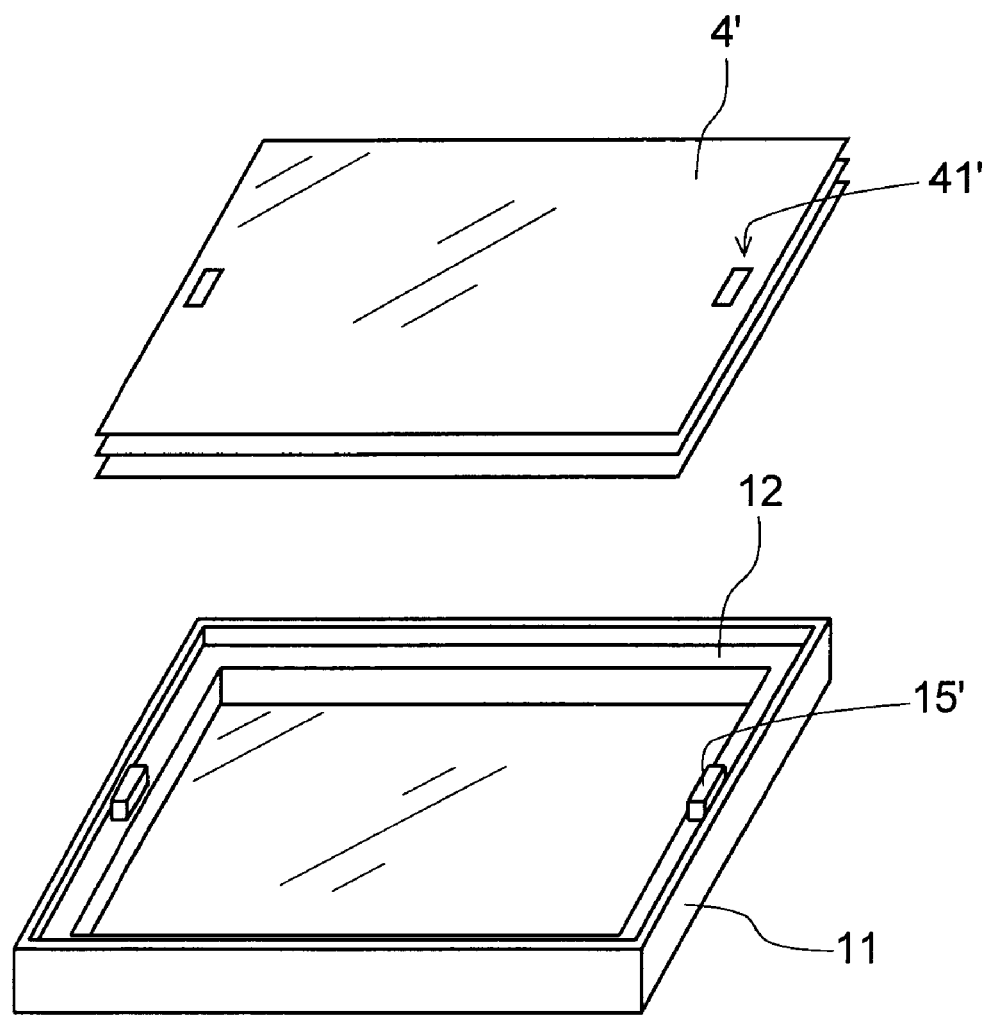
FIG. 10 is a perspective view showing another example of conventional optical sheets and a conventional backlight device.

In FIG. 7 is shown an enlarged plan view of a portion of the optical sheet 4 where it engages with the case 11. In the protrusion 41 on the optical sheet 4, the maximum width of the protrusion 41 as measured in the direction parallel to the line between both ends of the base of the protrusion 41 is greater than the width of the base along the side of the optical sheet 4. The recess 15 in the case 11 is similar in shape to the protrusion 41 on the optical sheet 4 and is larger than the protrusion 41 such that, when the protrusion 41 on the optical sheet 4 fits into the recess 15, a slight gap is left therebetween. As mentioned previously, this gap is designed to absorb the thermal expansion and contraction of the optical sheet 4; it is generally preferable that the gap be about 1 mm to about 3 mm wide, for example. The width of the mouth portion of the recess 15 is preferably narrower than the maximum width of the protrusion 41. Thus, even when the optical sheet 4 thermally contracts inward of the case 11, the portion of the maximum width of the protrusion 41 is prevented from disengaging from the mouth portion of the recess 15. This helps surely prevent the optical sheet 4 from disengaging from the case 11.

The shape of the protrusion 41 formed on the optical sheet 4 is subject to no particular restriction except that the maximum width of the protrusion 41 needs to be greater than the width of the base. FIGS. 8A-8F show some examples. As shown in FIG. 8A, the protrusion 41a may be circular, with the recess 15a in the case 11 correspondingly formed circular as seen in plan view. As shown in FIG. 8B, the protrusion 41b may be L-shaped; or as shown in FIG. 8C, the protrusion 41c may be inverted T-shaped. Or, as shown at FIGS. 8D, 8E, and 8F, the protrusion may be shaped such that the line connecting both ends of the base is not parallel to the side of the optical sheet 4 in which the protrusion is formed. With any of these shapes, so long as the maximum width of the protrusion 41 is greater than the width of the base, the benefits of the present invention are obtained.

The locations where the protrusions 41 on the optical sheet 4 are formed and the number of protrusions 41 formed are subject to no particular restriction; however, in consideration of the strength and the ease of assembly of the optical sheet 4 and other factors, it is preferable that as few protrusions 41 as possible be formed. In a case where only one protrusion 41 is formed, it is preferable to form the protrusion and the recess on a line that passes through the center G (0, 0) of gravity of the optical sheet and that perpendicularly intersects the top side of the optical sheet 4, that is, its side located highest in the direction of gravity in actual use. Thus, it is possible to restrict the displacement of the optical sheet in all directions.

In a case where, in the top of the optical sheet 4, more than one engagement portions where a protrusion 41 engages with a recess 15 are provided, as shown in FIG. 5, as considered in a two-dimensional rectangular coordinate system having its original G (0, 0) at the center of gravity of the optical sheet, having its y-axis running parallel to a line that perpendicularly intersects the top side of the optical sheet 4 and having its x-axis running parallel to the top of the optical sheet 4, it is preferable that the sum of the x-coordinates of locations where the recesses 15 in the frame 11 engage with the protrusions 41 on the optical sheet 4 be zero. Thus, the optical sheet is balanced about the y-axis passing through the center G of gravity of the optical sheet.

With an optical sheet according to a preferred embodiment of the present invention, it is possible to position the optical sheet in place within a case reliably and quickly, and also to prevent the optical sheet from disengaging from the case due to thermal contraction, and to prevent the optical sheet from tearing while being shaped or otherwise processed or on receiving an external impact.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight device for a display device, the backlight device including:
   a light source emitting light;
   an optical sheet having a notch formed in a side thereof and arranged to adjust an optical path of the light emitted from the light source to direct the light to a back side of a display panel; and
   a frame arranged to attach the optical sheet to the back side of the display panel; wherein
   as seen in plan view, a maximum width of the notch as measured in a direction substantially parallel to a line connecting both ends of a mouth portion of the notch is greater than a width of the mouth portion;
   at least one projection with which the at least one notch in the optical sheet respectively engages is disposed on the frame so that, by making the at least one notch in the optical sheet engage with the at least one projection on the frame, the optical sheet is positioned in place; and
   in a two-dimensional rectangular coordinate system having an origin G(0, 0) thereof at a center of gravity of the optical sheet, having a y-axis thereof running perpendicularly to a side of the optical sheet that is located highest in a direction of gravity in actual use, and having an x-axis thereof running parallel to said side of the optical sheet, a sum of an x-coordinate of a location at which the at the least one projection on the frame respectively engages with the at least one notch in the optical sheet equals zero.

2. A display device comprising the backlight device of claim 1.

3. The backlight device of claim 1, wherein
   only one notch is provided in the optical sheet, and the projection on the frame and the notch in the optical sheet are arranged on the y-axis.

4. A backlight device for a display device, the backlight device including:
   a light source emitting light;
   an optical sheet including a notch provided in a side thereof and arranged to adjust an optical path of the light emitted from the light source to direct the light to a back side of a display panel; and
   a frame arranged to attach the optical sheet to the back side of the display panel; wherein
   as seen in plan view, a maximum width of the notch as measured in a direction substantially parallel to a line connecting both ends of a mouth portion of the notch is greater than a width of the mouth portion;
   at least one recess with which at least one protrusion on the optical sheet respectively engages is disposed in the frame such that, by making the at least one protrusion on the optical sheet engage with the at least one recess in the frame, the optical sheet is positioned in place; and
   in a two-dimensional rectangular coordinate system having an origin G(0, 0) thereof at a center of gravity of the optical sheet, having a y-axis thereof running perpendicularly to a side of the optical sheet that is located highest in a direction of gravity in actual use, and having an x-axis thereof running parallel to said side of the optical sheet, a sum of an x-coordinate of a location at which the at least one recess in the frame respectively engages with the at least one protrusion on the optical sheet equals zero.

5. A display device comprising the backlight device of claim 4.

6. A display device comprising the backlight device of claim 3.

7. The backlight device of claim 4, wherein
   only one protrusion is provided on the optical sheet, and the recess in the frame and the protrusion on the optical sheet are arranged on the y-axis.

8. A display device comprising the backlight device of claim 7.

* * * * *